Aug. 15, 1967     H. C. SWIFT     3,335,819
PIVOTED, CALIPER TYPE DISK BRAKE
Filed July 2, 1965     6 Sheets-Sheet 1

INVENTOR.
Harvey C. Swift
BY
Barnes, Dickey & Pierce
ATTORNEYS.

Aug. 15, 1967 H. C. SWIFT 3,335,819
PIVOTED, CALIPER TYPE DISK BRAKE
Filed July 2, 1965 6 Sheets-Sheet 2
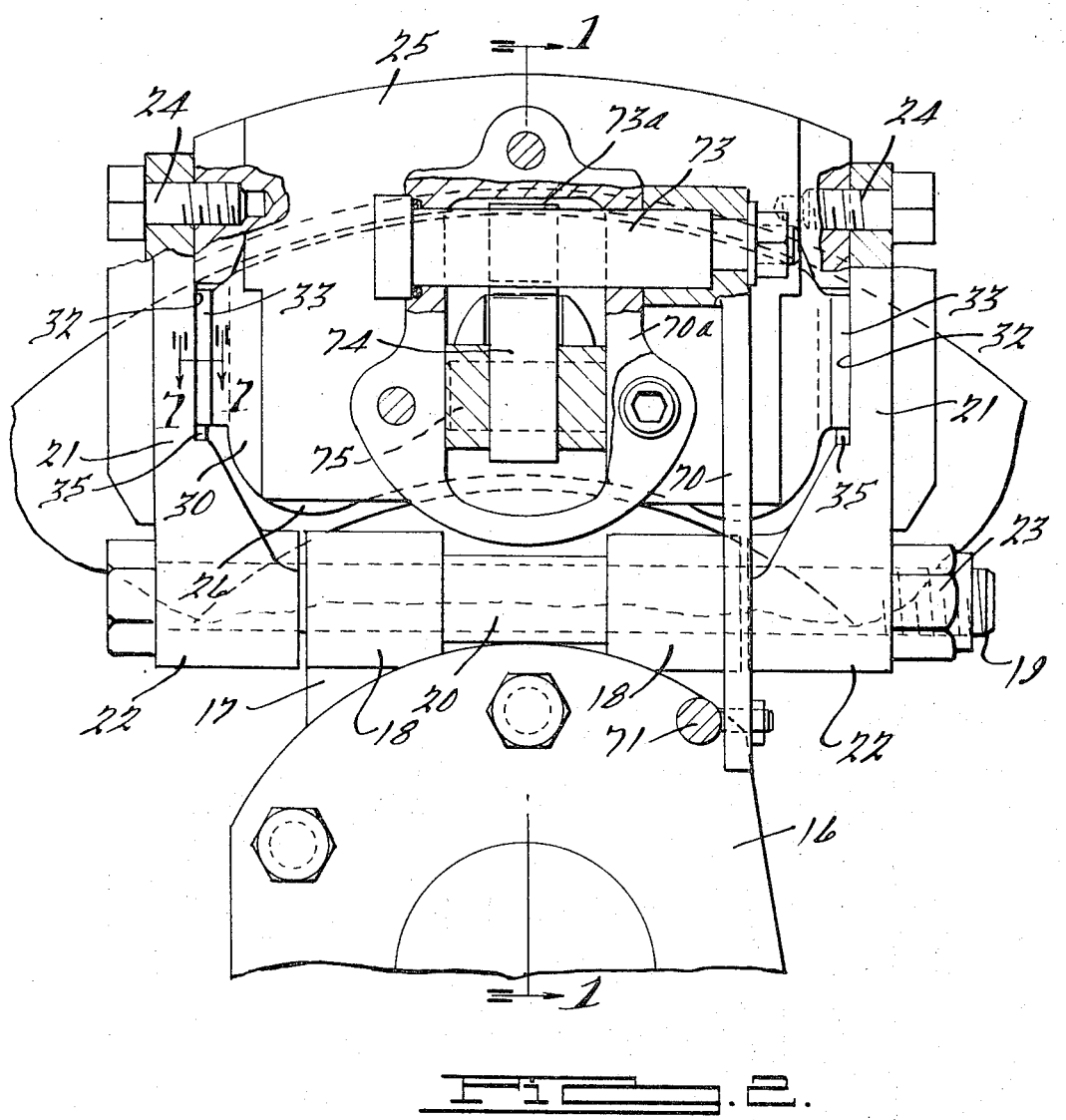
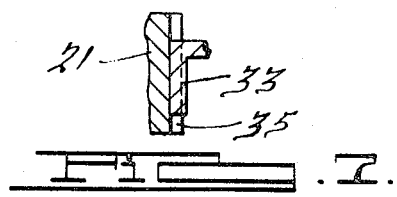
INVENTOR.
Harvey C. Swift.
BY
Harness, Dickey & Pierce
ATTORNEYS.

Aug. 15, 1967 H. C. SWIFT 3,335,819
PIVOTED, CALIPER TYPE DISK BRAKE
Filed July 2, 1965 6 Sheets-Sheet 4
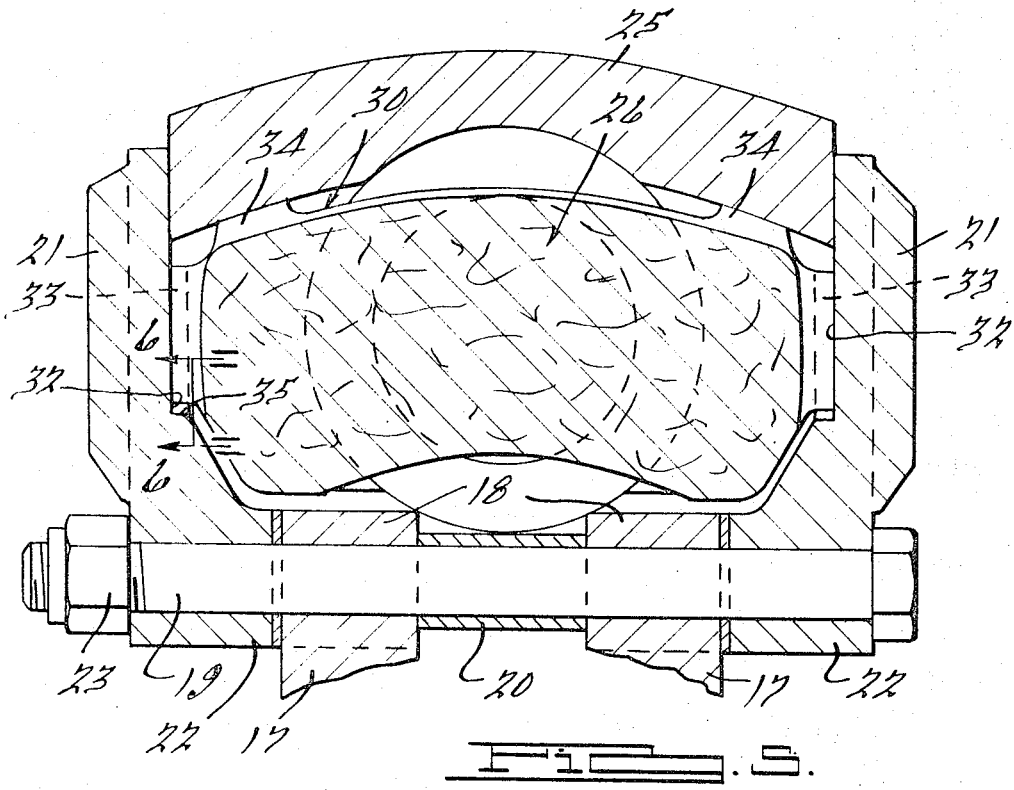
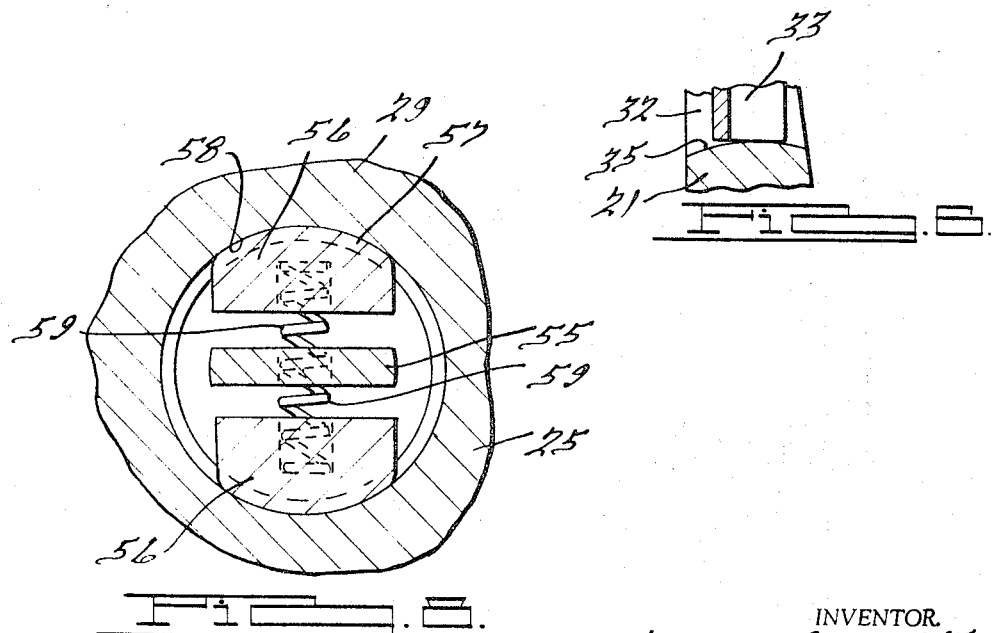
INVENTOR.
Harvey C. Swift
BY
Harness, Dickey & Pierce
ATTORNEYS

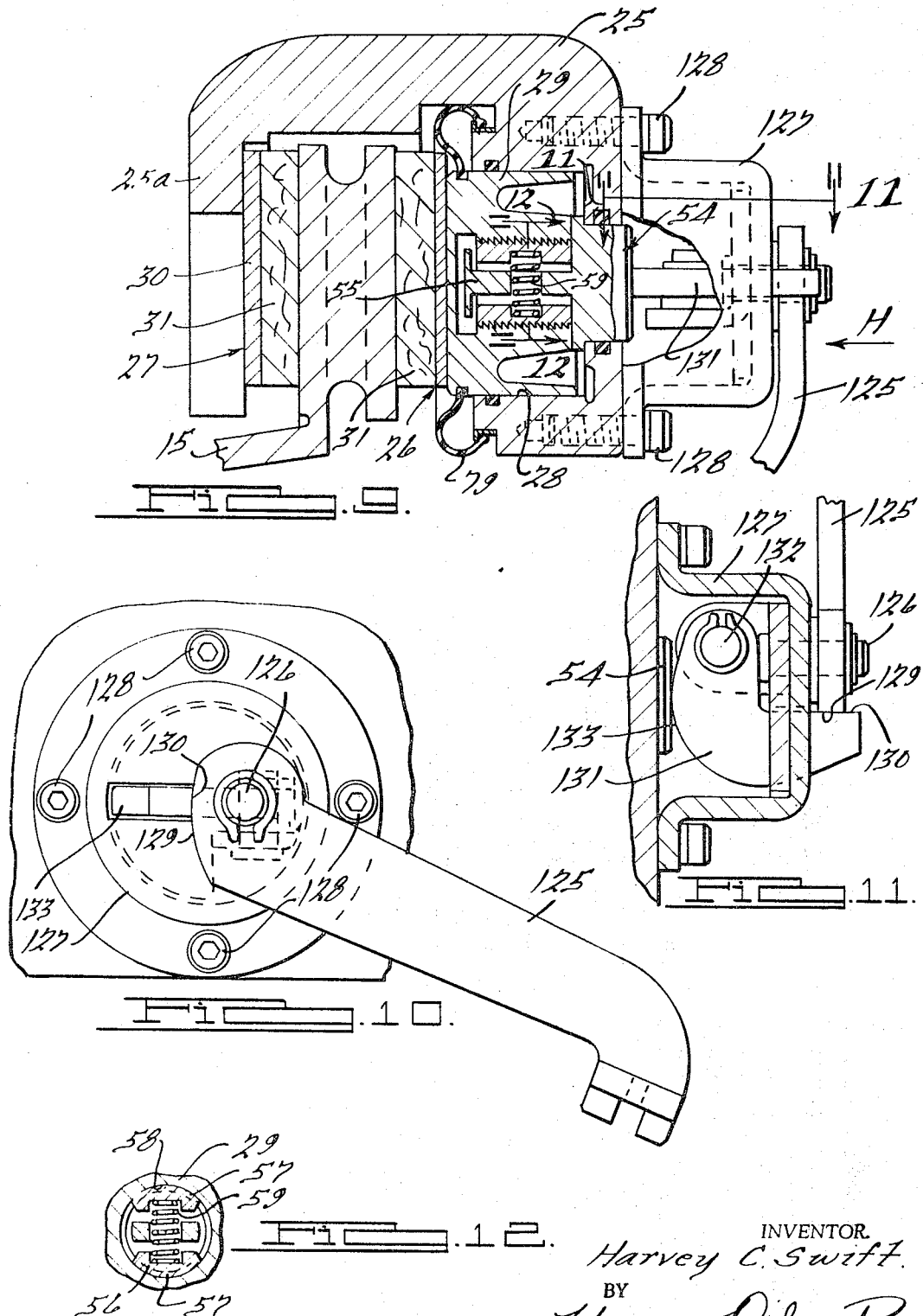

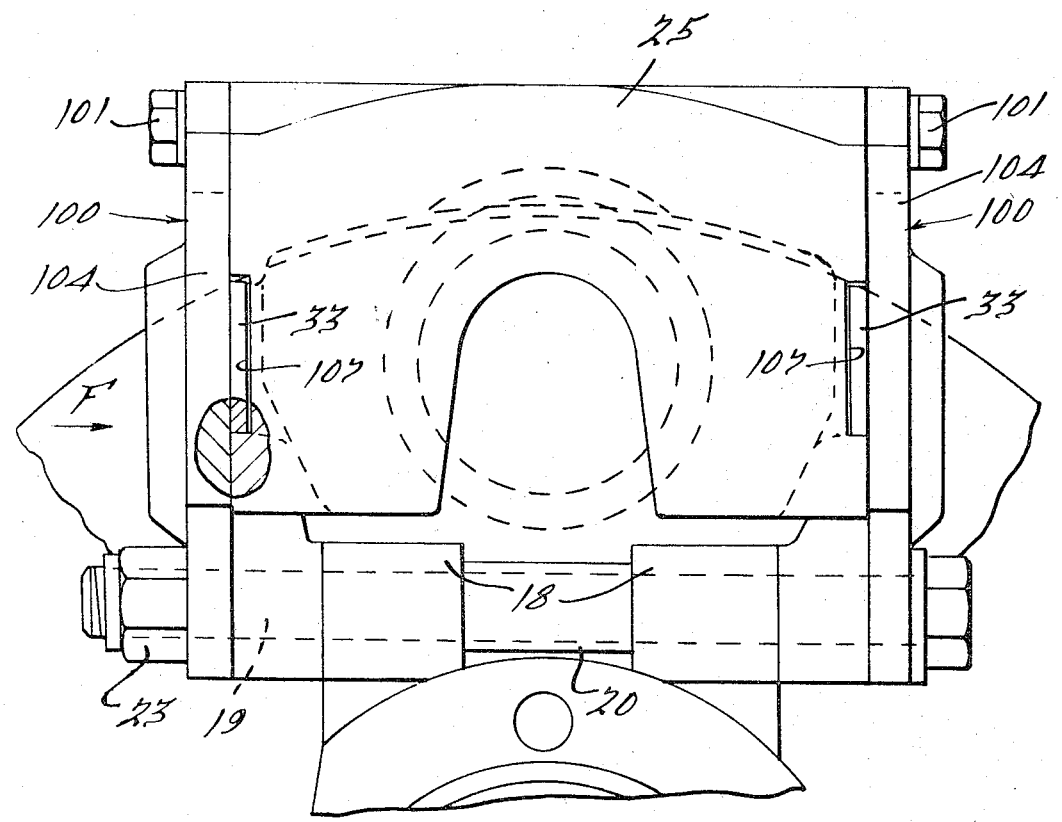
FIG. 13.
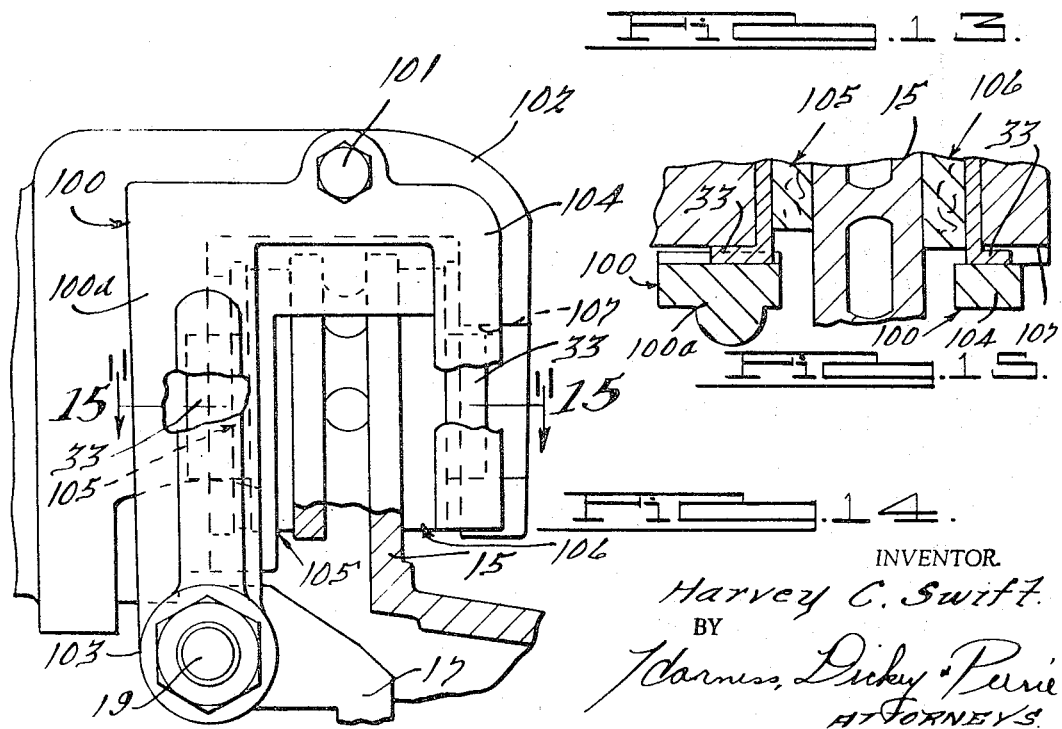
FIG. 14.
FIG. 15.
INVENTOR.
Harvey C. Swift
BY
Harness, Dickey & Pierce
ATTORNEYS

United States Patent Office 3,335,819
Patented Aug. 15, 1967

3,335,819
PIVOTED, CALIPER TYPE DISK BRAKE
Harvey C. Swift, Birmingham, Mich., assignor to Kelsey-Hayes Company, Romulus, Mich., a corporation of Delaware
Filed July 2, 1965, Ser. No. 469,268
10 Claims. (Cl. 188—73)

The invention relates to brakes of the disk type and, more particularly, to a combined hydraulic and mechanical brake. In brake combinations of this type, the mechanical brake is usually employed as a parking or emergency brake.

One of the objects of this invention is to provide a brake of this general type having means to provide for the automatic alignment of the brake shoes with the brake disk to thereby obtain full brake lining contact with the brake disk and uniform wear on the brake linings, irrespective of manufacturing irregularities inherent in the brake structure.

Another of the objects of this invention is to provide a brake of this type in which the caliper is pivotally supported for free rocking movement in a direction at right angles to the plane of the brake disk, thereby permitting the caliper to seek its own center with respect to the rotor or brake disk. This permits the caliper and the brake shoes supported thereby to conform to manufacturing irregularities inherent in brake structures produced in mass production.

Another object of this invention is attained by pivoting the supporting links to the caliper on centers in radial alignment with the periphery of the rotor or brake disk whereby the caliper is pivotally supported equidistance from the braking surfaces of the brake disk. The brake shoes carried by the caliper are therefore properly positioned with respect to the adjacent surfaces of the brake disk, irrespective of any irregularities in the latter.

Another object of the invention is to provide means on the links and caliper to take the torque of the brake shoes and to permit relative movement between the brake shoes and caliper and links, whereby the brake shoe linings remain substantially parallel to the faces of the brake disk.

Another object of the invention is to provide a mechanical brake actuating means which is coordinated with the hydraulically operated portion of the brake, whereby the same brake actuating piston may be employed for actuating the brakes both hydraulically and mechanically.

Another object of the invention is to incorporate in the brake actuating piston means for adjusting one part thereof to compensate for wear on the brake shoe linings. Thus, when the hydraulic means is used to apply the brakes, the adjustment necessary to compensate for excessive wear on the brake shoe linings will occur.

The various objects and advantages, and the novel details of construction of two commercially practical embodiments of the invention, will become more apparent as this description proceeds, especially when considered in connection with the accompanying drawings, in which:

FIGURE 2 is a sectional elevational view looking at the inboard shoe of the device with the manually operating means for the brake partly in section;

FIGURE 5 is a sectional view taken substantially on the plane indicated by line 5—5 in FIGURE 4;

FIGURE 6 is a detail sectional view taken on line 6—6 in FIGURE 5;

FIGURE 7 is a detail sectional view taken on line 7—7 in FIGURE 2;

FIGURE 8 is an enlarged detail sectional view taken on line 8—8 in FIGURE 1;

FIGURE 9 is a view similar to FIGURE 1 of a slightly modified form of construction;

FIGURE 10 is a view looking in the direction of arrow "H" in FIGURE 9;

FIGURE 11 is a detail sectional view taken substantially on the plane indicated by line 11—11 in FIGURE 9;

FIGURE 12 is a detail section taken on line 12—12 in FIGURE 9;

FIGURE 13 is a view similar to FIGURE 3 of the modified form of construction;

FIGURE 14 is an elevational view looking in the direction of arrow "F" in FIGURE 13; and FIGURE 15 is a detail sectional view taken on line 15—15 in FIGURE 14.

Figure 1:
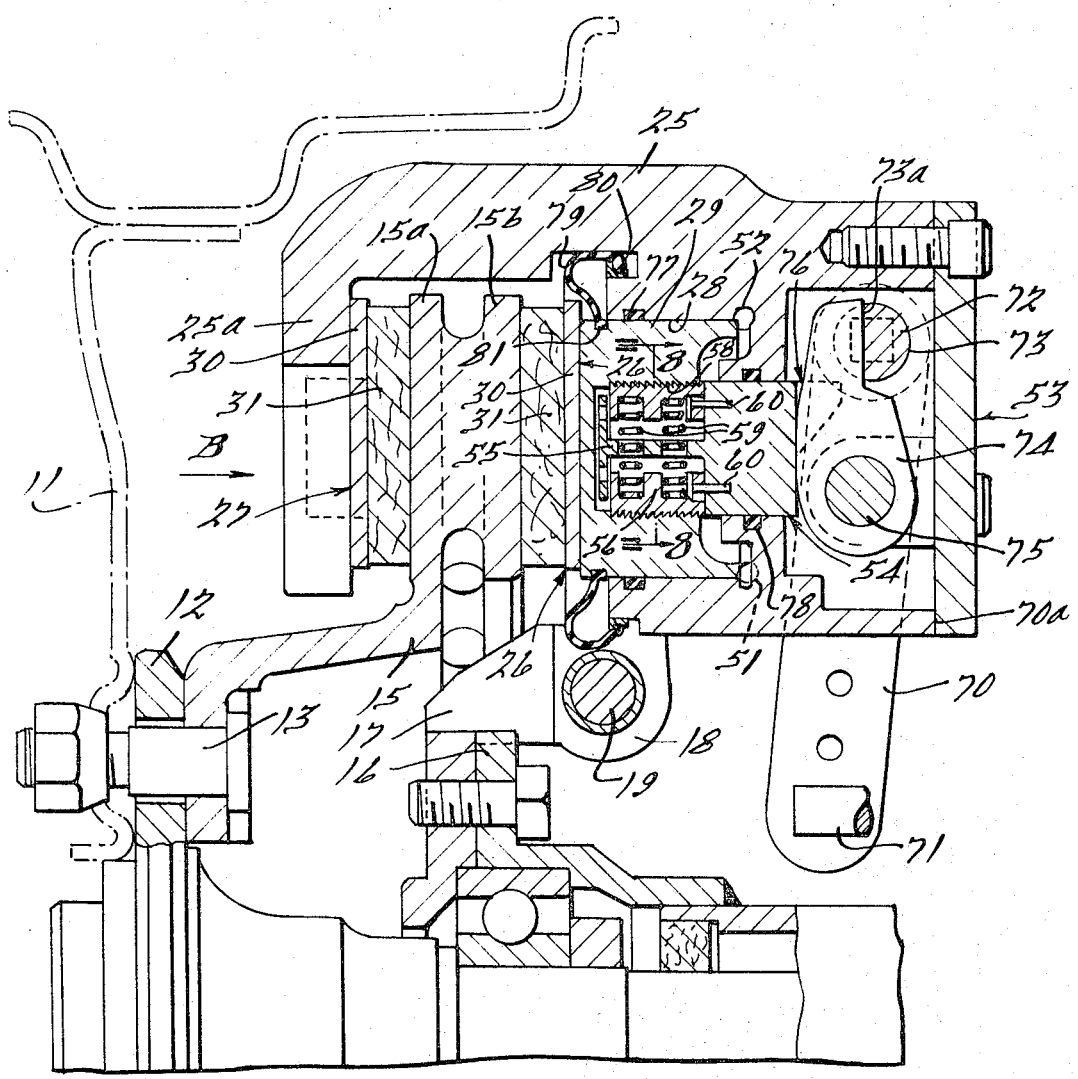
FIGURE 1 is a fragmentary sectional view taken substantially on the plane indicated by line 1—1 in FIGURE 2, with a portion of the wheel indicated by broken lines.
Figure 3:
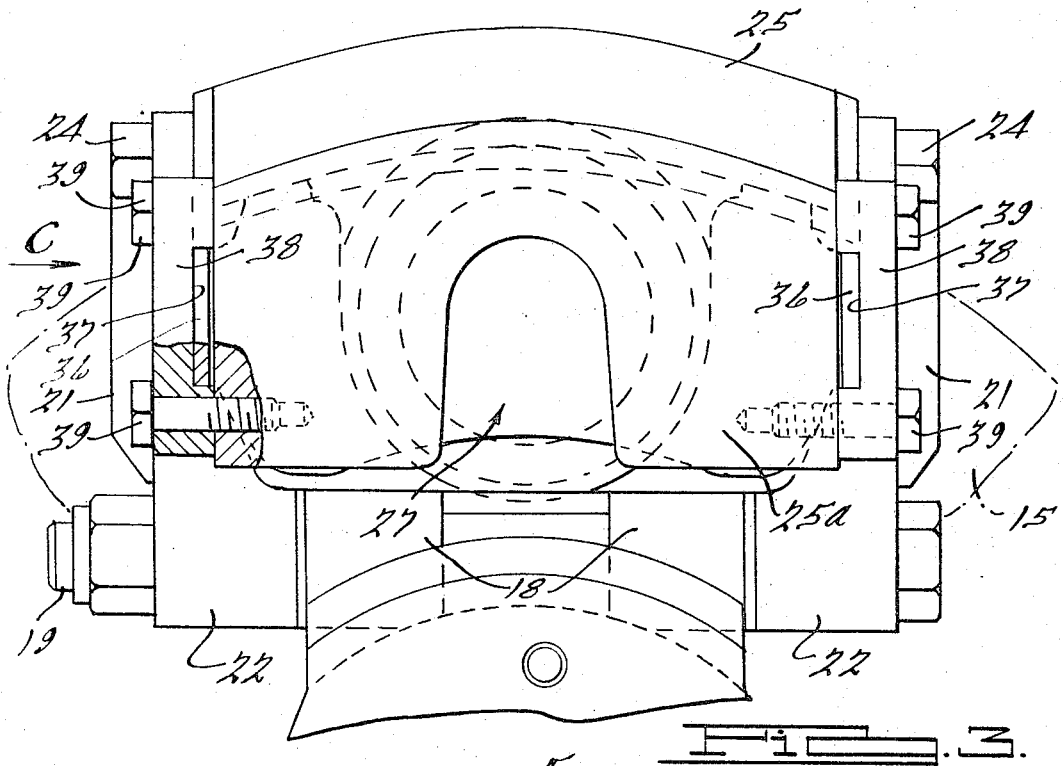
FIGURE 3 is an elevational view looking in the direction of arrow "B" in FIGURE 1.
Figure 4:
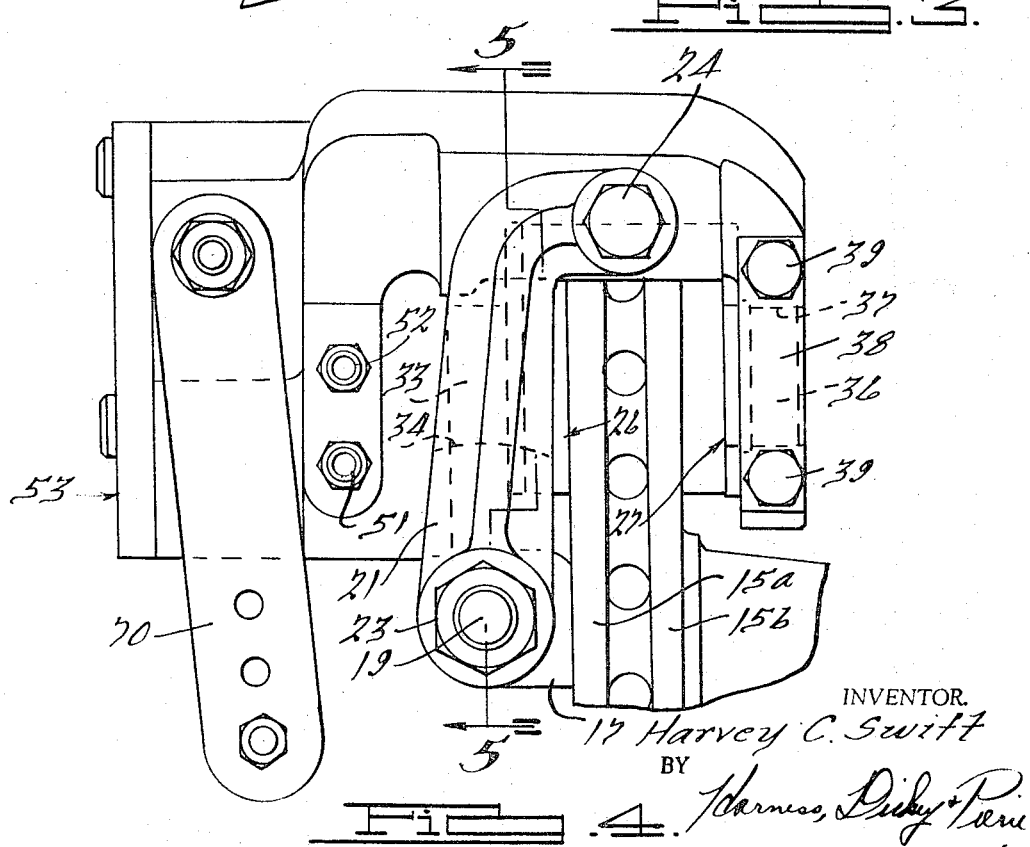
FIGURE 4 is a side elevational view looking in the direction of arrow "C" in FIGURE 3.

The brake of this invention is shown as being associated with a vehicle wheel body 11 secured to the axle flange 12 by means of studs or bolt and nut assemblies 13. Also secured to the axle flange 12, as, for instance, by means of the same studs or bolt and nut assemblies 13, fo rrotation with the wheel body 11, is a brake disk 15. The brake disk 15 is of the ventilated type having spaced walls 15a and 15b.

Secured to a fixed part 16 of the axle structure is a torque member 17. Attached to the torque member 17 are spaced sleeve-like members 18 through which a shaft or rod 19 extends. A spacer sleeve 20 is positioned on this rod between the sleeves 18. The reference character 21 indicates a pair of links having bearing or journal portions 22 rotatably mounted on the rod or shaft 19. The bearings or journals 22 are freely rotatable on the rod or shaft 19 and the whole assembly is secured in assembled relation as shown in FIGURE 2 by means of a nut or the like 23 secured to the end of the shaft 19.

The upper free end of each link member 21 is freely pivoted or journaled as at 24 to a caliper-like member 25 which straddles a portion of the periphery of the brake disk 15. The pivotal supports 24 for the caliper-like member 25 are independent of one another so that independent pivotal movement of the caliper 25 on the pivots 24 is possible. The pivotal supports 24 are in alignment with one another transversely of the caliper and are arranged in radial alignment with the periphery of the rotor, whereby the caliper is pivotally supported equidistant from the braking surfaces of the brake disk.

The reference character 26, FIGURE 2, indicates one brake shoe which is supported by the adjacent links 21, and the reference character 27 indicates the other brake shoe. One leg of the caliper 25 is provided with a recess 28 forming a cylinder to slidably receive a piston 29. When fluid under pressure is admitted to the cylinder 28, the piston is moved to the left, as viewed in FIGURE 1, and engages the adjacent brake shoe 26 to move against the rotor or brake disk. The reacton of this movement of the piston operates in an opposite direction to move the caliper 25 so that the other end 25a of the caliper moves against the other brake shoe 27 to force the same into engagement with the brake disk 15. Thus, both brake shoes are actuated simultaneously by the use of a single piston.

Each brake shoe is provided with a backing plate 30 carrying the friction lining 31 adapted to engage the braking surfaces 15a and 15b of the brake disk 15.

The inboard brake shoe 26 is supported in slots or recesses 32 formed in the adjacent surfaces of the links 21. For this purpose, the backing plate 30 of the brake shoe 26 is provided at each end with a flange 33 which engages the slot 32 in the link 21. Inasmuch as the links rock, means is provided for a slight relative sliding movement between the links and the brake shoe 26 in the slots or recesses 32. The bottom of each slot 32 is provided with a curved or rounded surface 35 with which the lower end of each flange 33 engages. Said rounded surface 35 is curved on the axis of the shaft 19. Thus, as the links 21 are rocked, this rocking movement does not displace the brake shoe 26, but permits the same to ride on the surface 35 and remain parallel to the adjacent face of the brake disk or rotor. The backing plate or brake shoe 26 is provided with extensions 34 which engage the caliper to limit upward movement of brake shoe 26.

The other brake shoe 27 is secured to the caliper 25 by means of flanges 36 which engage in recesses 37 formed in brackets 38 which are secured by bolts 39 to the adjacent faces of the caliper 25.

The torque imparted to the brake shoe 26 is taken through the flanges 33 to the links 21 and thus through the shaft 19 to the torque member 17. The flanges 36 on the outboard shoe 27 take the torque from this shoe and transmit it through the recesses 37 directly to the caliper member 25.

With the structure thus far described, it will be apparent that the pivoted links 21 may move not only in a direction at right angles to the direction of rotation of the brake disk 15, to permit the reaction movement of the caliper, but the caliper can rotate in the plane of the pivots 24 to align the brake shoes with the rotor when the faces of the rotor are distorted. This is permitted by the relative movement of the pivots 24 to one another. Also, the caliper 25 can rock perpendicularly to the rotor to align the brake shoe faces when the rotor faces are not perpendicular to each other or to the brake shoes. Thus, a substantially universal movement is permitted which will provide for automatically aligning the brake shoes with the brake disk. This results in a full brake lining contact with the brake disk and uniform wear on the brake linings, irrespective of manufacturing irregularities inherent in the structure.

The brake shoes may be operated either hydraulically or manually, as shown in FIGURE 1.

The reference character 29 indicates the hydraulic piston to which fluid under pressure is admitted through an inlet passage 51 behind the piston. The reference character 52 indicates a bleed opening.

The brake shoe 26 is engaged by the piston 29 to operate the brake hydraulically and may also be operated mechanically by manually operated means, indicated generally by the reference character 53.

In order to adjust the piston 29 to compensate for wear on the brake lining, the piston is provided with an adjustable plug-like member or extension 54 to which an arbor-like member 55 is attached. The rear end 54 is a solid plug-like member, as illustrated in FIGURE 1, and the front part is provided with a plurality of exteriorly threaded segments 56 provided with exterior abutment type threads or teeth 57 engaging abutment type threads or teeth 58 on the interior of the piston 29. Springs 59 are supported by the arbor 55 and urge the segments 56 outwardly so as to keep the teeth 57 and 58 into engagement with one another. The two portions of the plug-like member are aligned and held together by means of pins 60.

When the piston 29 (FIGURE 1) is actuated, by the hydraulic means, the plug-like member 54 tends to move under hydraulic pressure toward the right, in FIGURE 1, and piston 29 moves toward the left to actuate brake shoe 26. If the movement of the piston is such, due to wear on the brake lining, that there is sufficient relative movement between the segments 56 and the piston, the plug 54 and the segments 56 move one tooth space so as to lengthen the plug member 54 to cause a greater movement of the brake shoe 26 on the next operation.

The manually controlled means may be of any suitable or preferred type. In the form shown, there is provided an operating lever 70 which may be connected by a link 71 to an operating handle (not shown). Movement of the lever in the direction of the arrow will rotate the cam shaft 72 and rotate a cam member 73 which will engage the abrupt face 73a of a cam lever 74 mounted on a shaft 75 adjacent the end of the plug-like member 54. The parts just described may be conveniently housed in an extension 70a extending from caliper 25 or otherwise secured thereto. Rotation of the cam member 74 will cause the cam surface 76 thereof to engage the end of the plug member 54 and move the entire plug member and piston 29 towards the left, as viewed in FIGURE 1, to apply the brake shoe 26. The reaction of the caliper will cause the end 25a thereof to actuate the brake shoe 27.

The piston 29 is provided with an annular seal 77 which may be an O-ring and the plug portion 54 is provided with a seal 78 which may also be in the form of an O-ring. A boot 79 is attached to the caliper, as indicated at 80, and to the piston 29, as indicated at 81. This prevents dust and dirt from entering between the bore 28 in the caliper and the piston 29.

A slightly modified form of construction is illustrated in FIGURES 9–14. This form of construction is substantially the same as that previously illustrated, except that the links 100 are substantially U-shaped and are freely pivoted intermediate their lengths as at 101 to the caliper 102. Each link is freely pivoted at its other end, as at 103, to the rod member 19, which is carried by the torque member 17, as in the previously described construction. In this form of construction, each link 100 has a main leg 100a and a leg or extension 104 beyond the pivot 101 which extends parallel to the other leg 100a of the links. The link is pivoted at 101 to the caliper 25 in radial alignment with the periphery of the rotor. The brake shoes are indicated by the reference characters 105 and 106 and the brake shoe 105 is slidably mounted in the legs 100a of the links, as shown and described in connection with FIGURES 6 and 7 of the previously described construction. Each brake shoe 105 is provided with end flanges 33, the same as the brake shoes in the previously described construction, so that the brake shoe 105 is supported at its ends on the links 100 and the torque is taken on legs 100a of the links for the inboard shoe 105. The caliper is provided with recesses or notches 107 into which the edges of the flanges 33 of the brake shoe 106 freely extend. The torque of brake shoe 106 is taken by the legs 104 of the links 100, and the notches 107 serve to guide the brake shoe 106; see FIGURE 15.

The manually controlled actuating means in this form of construction consists of an operating lever 125 pivotally mounted as at 126 in a pivot carried by a housing 127 secured by screws or the like 128 to the caliper 25. The end of the lever 125 beyond the pivot 126 is provided with a cam surface 129 arranged exteriorly of the housing 127. This cam surface engages the surface 130 of a cam lever 131 pivotally mounted as at 132 within the housing 127. The cam lever 131 is provided with a cam surface 133 which engages the end of the plug-like piston member 54. Thus, by moving the lever 125, the cam lever 131 is actuated to move the plug member 54 and the piston 29 into brake applying position.

As stated above, any preferred or desired manual operating means may be employed in connection with this invention.

In both of the manually operated means, after operation of the brakes thereby, the first application by the hydraulic means will reposition the manual means, including the hand brake lever, back to its original release position.

Normally, the two pivots 24 in the first form of construction and the two pivots 101 in the second form will be in alignment and, inasmuch as these pivots are in radial alignment with the rotor, the brake linings on the brake shoes will be normally parallel to the braking surfaces on the rotor, so that full brake lining contact with the brake disk is obtained.

With both forms of construction, the links provide for a substantial universal movement of the caliper and the brake shoes relative to the brake disk so as to provide a full brake lining contact with the brake disk and uniform wear on the brake linings, irrespective of manufacturing irregularities inherent in the structure.

While two commercially practical embodiments of the invention have been described and illustrated herein somewhat in detail, it will be understood that various changes may be made as may come within the purview of the accompanying claims.

What is claimed is:

1. In a disk brake for a wheel supported for rotation relative to a stationary axle part, a brake disk secured to said wheel for rotation therewith and defining a pair of oppositely facing radially extending brake surfaces, a caliper straddling at least a portion of the periphery of said brake disk, a pair of opposed brake shoes associated with said caliper and adapted to engage respective of said brake disk surfaces, and means carried by said caliper for actuating said brake shoes, that improvement which comprises, supporting means, means pivotally connecting said supporting means relative to said stationary axle part on one side of said brake disk, and means pivotally connecting said supporting means to said caliper adjacent the outer periphery of said brake disk and substantially equidistant between said brake shoes for movement of said caliper for alignment of the faces of said brake shoes with the respective surfaces of said brake disk in all out of true conditions.

2. A device as set forth in claim 1 further including means for maintaining at least one of the brake shoes in a substantially fixed radial position with respect to its associated brake disk surface upon movement of the caliper.

3. In a disk brake for a wheel supported for rotation relative to a stationary axle part, a brake disk secured to said wheel for rotation therewith and defining a pair of oppositely facing radially extending brake surfaces, a caliper straddling at least a portion of the periphery of said brake disk, a pair of opposed brake shoes associated with said caliper and adapted to engage respective of said brake disk surfaces, and means carried by said caliper for actuating said brake shoes, that improvement which comprises, first and second link means disposed on respective opposite sides of said caliper, means pivotally connecting said first and said second link means relative to said stationary axle part, and means pivotally connecting said first and said second link means to said caliper adjacent the outer periphery of said brake disk and substantially equidistant from said brake shoes, said pivotal connections for said link means and for said caliper permitting substantially universal movement thereof to obtain full brake lining contact with the brake disk and uniform wear on the brake linings, irrespective of manufacturing irregularities inherent in the brake structure.

4. A device as described in claim 3, in which said stationary part consists of torque members secured to the axle structure of the wheel, a rod extending through said torque member, and said rod having end portions on which the ends of said links are freely pivoted thus providing the pivotal connection between said links and said axle structure.

5. In a disk type brake for a wheel supported for rotation relative to a stationary axle part, a brake disk secured to said wheel for rotation therewith and defining a pair of oppositely facing radially extending brake surfaces, a caliper straddling at least a portion of the periphery of said brake disk, a pair of opposed brake shoes associated with said caliper and adapted to engage respective of said brake disk surfaces, a brake actuating piston carried by said caliper adapted to actuate one of said brake shoes and through said caliper to actuate the other brake shoe, that improvement which comprises, first and second link means disposed on respective opposite sides of said caliper, means pivotally connecting said first and said second link means relative to said stationary axle part, and means pivotally connecting said first and said second link means to said caliper adjacent the outer periphery of said brake disk and substantially equidistant from said brake shoes, said pivotal connections for said link means and for said caliper permitting movement thereof to align the faces of the brake shoes with the brake disk in all out-of-true conditions.

6. A device as described in claim 5, in which the brake actuating piston is provided with a plug portion having externally threaded abrupt teeth on spring pressed segments thereof engaging similar teeth on the interior of the piston, an adjacent brake shoe engageable by said piston, said threads adapted to be held into engagement with one another, whereby if the piston moves more than one tooth space, due to excessive wear on the brake lining, it will be held in this new position to compensate for wear on the brake shoes.

7. In a disk type brake for a wheel supported for rotation relative to a stationary axle part, a brake disk secured to said wheel for rotation therewith and defining a pair of oppositely facing radially extending brake surfaces, a caliper straddling at least a portion of the periphery of said brake disk, a pair of opposed brake shoes associated with said caliper and adapted to engage respective of said brake disk surfaces, a brake actuating piston carried by said caliper adapted to actuate one of said brake shoes and through said caliper to actuate the other brake shoe, that improvement which comprises, first and second link means disposed on respective opposite sides of said caliper, means pivotally connecting said first and said second link means relative to said stationary axle part, and means pivotally connecting said first and said second link means to said caliper adjacent the outer periphery of said brake disk and substantially equidistant from said brake shoes, said pivotal connections for said link means and for said caliper permitting said caliper to move in a substantially universal direction whereby it may move longitudinally to permit the reaction movement thereof; to rotate in the plane of the pivots upon relative movement of the pivots to align the brake shoes with the brake disk when said surfaces of the brake disk are distorted; and to rock on said pivots relative to said surfaces of said brake disk when the latter are not parallel to the brake disk.

8. In a disk brake for a wheel supported for rotation relative to a stationary axle part, a brake disk secured to said wheel for rotation therewith and defining a pair of oppositely facing radially extending brake surfaces, a caliper straddling at least a portion of the periphery of said brake disk, a pair of opposed brake shoes associated with said caliper and adapted to engage respective of said brake disk surfaces, and means carried by said caliper for actuating said brake shoes, that improvement which comprises, independent link means on opposite sides of said caliper pivotally connected to said stationary part and to said caliper, said links being substantially inverted U-shape and the pivotal connections with said caliper being intermediate the length of each link and located adjacent the outer periphery of said brake disk and substantially equidistant between said brake shoes, one of the brake shoes having a torque taking connection with one leg of each link, and the other brake shoe having a torque taking connection with the other leg of the link with the ends thereof extending freely through notches formed in the caliper.

9. In a disk brake for a wheel supported for rotation with respect to a stationary axle part, a brake disk secured to said wheel for rotation therewith and defining oppositely facing radially extending brake surfaces, a caliper straddling at least a portion of the outer periphery of said brake disk, a pair of opposed brake shoes associated with said caliper and adapted to engage respective of said disk brake surfaces, and means carried by said caliper for actuating said brake shoes into engagement with said brake disk surfaces, that improvement which comprises, first and second links on opposite sides of said caliper, means pivotally connecting one end of each of said links to said stationary axle part on one side of said brake disk, means pivotally connecting said links to said caliper for shifting of said caliper to compensate for alignment of said brake shoes with said brake disk surfaces, and means on said links cooperating with at least one of said brake shoes for maintaining said one brake shoe in a substantially fixed radial position with respect to its respective brake disk surface upon said movement of said caliper.

10. A device as set forth in claim 9 wherein the means on the links for maintaining the one brake shoe in the fixed radial position with respect to its associated brake disk surface comprises arcuate surfaces formed on each of said links about an axis coincident with the pivot axis of said links with respect to the stationary axle part and means on said one brake shoe in engagement with said arcuate surfaces.

References Cited

UNITED STATES PATENTS

| 2,404,326 | 7/1946 | Taylor | 188—79.5 |
| 2,820,530 | 1/1958 | Chovings et al. | 188—73 |
| 2,949,173 | 8/1960 | Peras | 188—73 X |
| 3,047,098 | 7/1962 | Olley | 188—73 |
| 3,268,034 | 8/1966 | Burnett | 188—73 |

FOREIGN PATENTS

| 1,279,344 | 11/1961 | France. |
| 1,319,419 | 1/1963 | France. |
| 734,271 | 7/1955 | Great Britain. |
| 806,919 | 1/1959 | Great Britain. |

MILTON BUCHLER, *Primary Examiner.*

G. E. A. HALVOSA, *Assistant Examiner.*